(12) United States Patent
Kava et al.

(10) Patent No.: US 11,117,483 B2
(45) Date of Patent: Sep. 14, 2021

(54) TRACTION BATTERY CHARGING METHOD AND CHARGING SYSTEM

(71) Applicant: Ford Global Technologies, LLC, Dearborn, MI (US)

(72) Inventors: Christopher Michael Kava, Livonia, MI (US); Shevon Vannitamby, Farmington Hills, MI (US); Lori Kohrs, Dearborn, MI (US); Mike Padgett, Garden City, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 162 days.

(21) Appl. No.: 16/590,531

(22) Filed: Oct. 2, 2019

(65) Prior Publication Data

US 2021/0101495 A1    Apr. 8, 2021

(51) Int. Cl.
*B60L 53/31*    (2019.01)
*H02J 7/00*    (2006.01)
*B60L 58/19*    (2019.01)
*B60L 53/14*    (2019.01)

(52) U.S. Cl.
CPC .............. *B60L 53/31* (2019.02); *B60L 53/14* (2019.02); *B60L 58/19* (2019.02); *H02J 7/00* (2013.01); *H02J 7/007* (2013.01)

(58) Field of Classification Search
CPC .......... B60L 53/31; B60L 53/16; B60L 58/19; B60L 53/62; B60L 53/53; B60L 58/21; B60L 58/10; B60L 53/14; B60L 58/12; B60L 53/11; B60L 58/22; B60L 50/16; B60L 53/00; B60Y 2200/91; B60Y 2300/91; Y02E 60/10; Y02T 90/12; Y02T 90/14; Y02T 10/7072; Y02T 10/70; G05B 2219/2637; G05B 19/042; H01M 10/46; H01M 10/441; H01M 2220/20; H02J 7/1423; H02J 7/00; H02J 7/007; H02J 7/0013; B60W 20/13; B60K 6/365
See application file for complete search history.

(56) References Cited

U.S. PATENT DOCUMENTS

| | | | | |
|---|---|---|---|---|
| 10,358,041 B2 * | 7/2019 | Lee | .......................... | H02J 7/022 |
| 10,790,680 B1 * | 9/2020 | Nguyen | ................ | H02J 7/0047 |
| 10,870,363 B2 * | 12/2020 | Kim | ........................ | B60L 53/67 |
| 10,967,746 B2 * | 4/2021 | Hiroe | ...................... | B60L 50/66 |
| 10,974,617 B2 * | 4/2021 | Hiroe | .................... | H01M 10/44 |
| 2006/0097696 A1 * | 5/2006 | Studyvin | ............... | H02J 7/0018 |
| | | | | 320/116 |

(Continued)

FOREIGN PATENT DOCUMENTS

| | | |
|---|---|---|
| CN | 101841178 A | 9/2010 |
| JP | 4984726 B2 | 7/2012 |
| WO | 2018077503 A1 | 5/2018 |

*Primary Examiner* — Nha T Nguyen
(74) *Attorney, Agent, or Firm* — David Kelley, Esq.; Carlson, Gaskey & Olds, P.C.

(57) ABSTRACT

A method of charging a traction battery of a vehicle includes, among other things, partitioning the traction battery of the electrified vehicle into a plurality of partitions. Each of the partitions is separately chargeable. The method then includes evaluating at least one characteristic of the plurality of partitions, and prioritizing a charging of the plurality of partitions from at least one external power source based on the evaluating.

15 Claims, 3 Drawing Sheets

(56) References Cited

U.S. PATENT DOCUMENTS

| | | | |
|---|---|---|---|
| 2010/0217485 A1* | 8/2010 | Ichishi | B60L 50/51 701/36 |
| 2011/0089904 A1* | 4/2011 | Ward | B60L 58/21 320/126 |
| 2012/0299549 A1* | 11/2012 | Kim | H02J 7/0024 320/118 |
| 2014/0210265 A1* | 7/2014 | Thorsoe | H02J 7/0036 307/23 |
| 2015/0222132 A1* | 8/2015 | Shikatani | H02J 7/007 320/117 |
| 2016/0001664 A1* | 1/2016 | Roth | B60L 50/66 318/139 |
| 2017/0028861 A1* | 2/2017 | Spesser | B60L 53/16 |
| 2017/0190257 A1* | 7/2017 | Chuang | H01M 10/441 |
| 2017/0253134 A1* | 9/2017 | Berger | B60L 53/14 |
| 2018/0201147 A1* | 7/2018 | Shin | B60L 53/62 |
| 2018/0222345 A1* | 8/2018 | Patel | B60L 58/10 |
| 2018/0272881 A1* | 9/2018 | Kojima | B60L 11/1825 |
| 2019/0009685 A1 | 1/2019 | Schmid et al. | |
| 2019/0106005 A1* | 4/2019 | Straber | B60L 50/66 |
| 2019/0148954 A1* | 5/2019 | Jeong | B60L 58/16 320/106 |
| 2019/0214832 A1* | 7/2019 | Li | H02J 7/02 |
| 2019/0255959 A1* | 8/2019 | Ruppert | B60L 53/53 |
| 2020/0055404 A1* | 2/2020 | Conlon | B60L 53/30 |
| 2020/0070667 A1* | 3/2020 | Wang | B60L 50/51 |
| 2020/0185936 A1* | 6/2020 | Oishi | H02J 7/0024 |
| 2020/0282862 A1* | 9/2020 | Handa | H02J 7/342 |
| 2021/0066928 A1* | 3/2021 | Maji | H02J 7/0013 |

\* cited by examiner

TRACTION BATTERY CHARGING METHOD AND CHARGING SYSTEM

TECHNICAL FIELD

This disclosure relates generally to charging a traction battery of an electrified vehicle and, more particularly, to partitioning the traction battery to facilitate charging.

BACKGROUND

Electrified vehicles differ from conventional motor vehicles because electrified vehicles are selectively driven using one or more electric machines powered by a traction battery. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

The traction battery is a relatively high-voltage battery that selectively powers the electric machines and other electrical loads of the electrified vehicle. The traction battery can include battery arrays each including a plurality of interconnected battery cells.

SUMMARY

A method of charging a traction battery of a vehicle, according to an exemplary aspect of the present disclosure includes, among other things, partitioning the traction battery into partitions. Each of the partitions is separately chargeable. The method then includes evaluating at least one characteristic of the partitions, and prioritizes a charging of the partitions from at least one external power source based on the evaluating.

In another example of the foregoing method, the at least one characteristic is a voltage imbalance for each of the partitions.

In another example of any of the foregoing methods, during the evaluating, a first one of the partitions has a first voltage imbalance and a second one of the partitions has a second voltage imbalance that is greater than the first voltage imbalance. The method includes prioritizing by charging the first one of the partitions prior to the second one of the partitions due to the second voltage imbalance being greater than the first voltage imbalance.

In another example of any of the foregoing methods, during the evaluating, a first one of the partitions has a first voltage imbalance and a second one of the partitions has a second voltage imbalance that is greater than the first voltage imbalance. The method includes prioritizing by fast charging the first one of the partitions due to the second voltage imbalance being greater than the first voltage imbalance.

In another example of any of the foregoing methods, the at least one characteristic is a state of charge for each of the partitions. During the evaluating, a first one of the partitions has a first state of charge and a second one of the partitions has a second state of charge that is greater than the first state of charge. The method further includes prioritizing by charging the first one of the partitions prior to the second one of the partitions due to the second state of charge being greater than the first state of charge.

In another example of any of the foregoing methods, the at least one characteristic is a temperature for each of the partitions. During the evaluating, a first one of the partitions has a first temperature and a second one of the partitions has a second temperature that is greater than the first temperature. The method further includes prioritizing by charging the first one of the partitions prior to the second one of the partitions due to the second temperature being greater than the first temperature.

In another example of any of the foregoing methods, the prioritizing includes using a first external power source to charge the first partition and a second external power source to charge the second partition.

In another example of any of the foregoing methods, the first external power source is a DC power source and the second external source is an AC power source.

Another example of any of the foregoing methods includes charging the first partition from the first external power source through a first charge port of the electrified vehicle, and, at the same time, charging the second partition from the second external power source through a second charge port of the electrified vehicle.

In another example of any of the foregoing methods, each of the partitions within the plurality of partitions is a separate array of a battery pack.

In another example of any of the foregoing methods, each of the partitions within the plurality of partitions is electrically isolated from the other partitions within the plurality of partitions.

An electrified vehicle charging system according to another exemplary aspect of the present disclosure includes, among other things, a traction battery, an electrical divider that can divide the traction battery into a plurality of partitions that are separately chargeable and electrically isolated from one another, and a charge control module that evaluates at least one characteristic of the plurality of partitions and, in response, prioritizes a charging of the plurality of partitions from at least one external power source.

In another example of the foregoing system, the at least one characteristic is a voltage imbalance for each of the partitions within the plurality of partitions.

In another example of any of the foregoing systems, the charge control module prioritizes by using a first external power source to charge the first partition and a second external power source to charge the second partition.

In another example of any of the foregoing systems, the first external power source is a DC power source and the second external source is an AC power source.

Another example of any of the foregoing systems, includes a first charge port of the electrified vehicle and a second charge port of the electrified vehicle. The first charge port is configured to communicate power from the DC power source to the electrified vehicle. The second charge port is configured to communicate power from the AC power source to the electrified vehicle.

In another example of any of the foregoing systems, each of the partitions within the plurality of partitions is a separate array of a battery pack.

In another example of any of the foregoing systems, each of the partitions within the plurality of partitions is electrically isolated from the other partitions within the plurality of partitions.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details a method of charging a traction battery of an electrified vehicle, and an associated charging system. The method partitions the traction battery into partitions that are separately chargeable. Characteristics of the partitions can be evaluated to prioritize a charging of the partitions. This can reduce a time spent charging the traction battery to a desired State of Charge (SOC).

Figure 1:
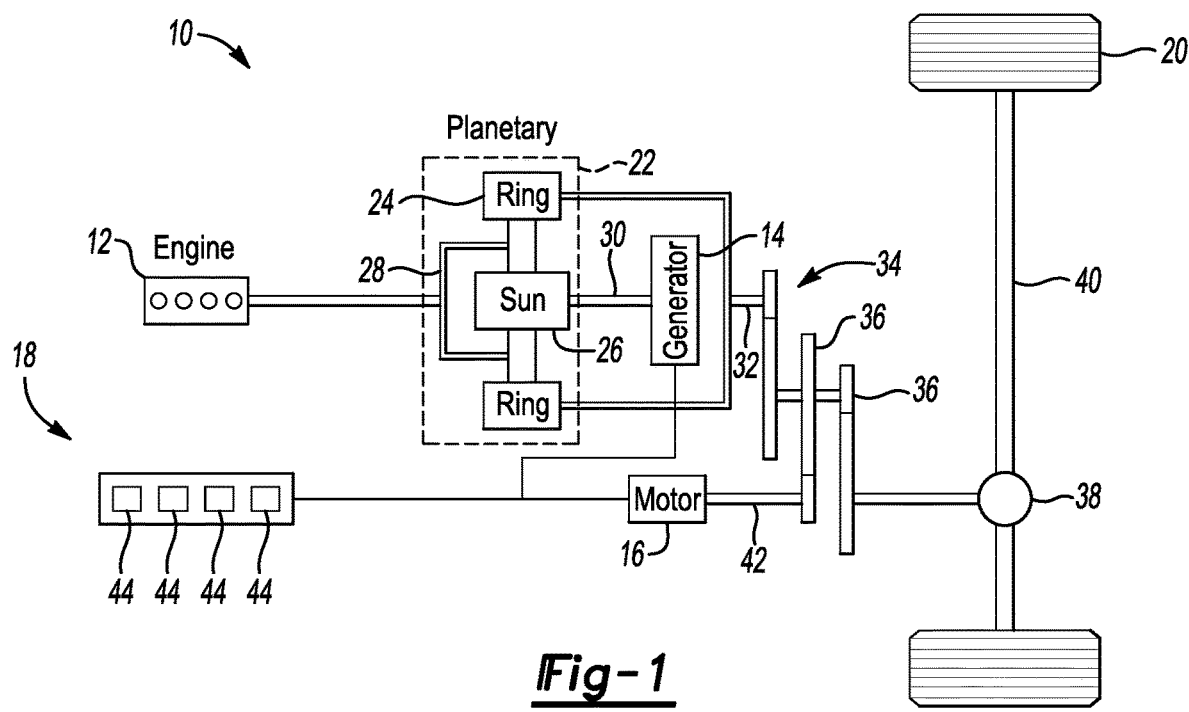
FIG. 1 schematically illustrates a powertrain of an electrified vehicle.

FIG. 1 schematically illustrates selected portions of a powertrain 10 of an electrified vehicle. Although depicted as a hybrid electrified vehicle (HEV), it should be understood that the concepts described herein are not limited to HEVs and could extend to other electrified vehicles, including, but not limited to, plug-in hybrid electrified vehicles (PHEVs), fuel cell vehicles (FCVs), and battery electrified vehicles (BEVs).

In an embodiment, the powertrain 10 is a powersplit powertrain system that employs a first drive system and a second drive system. The first drive system includes a combination of an engine 12 and a generator 14 (i.e., a first electric machine). The second drive system includes at least a motor 16 (i.e., a second electric machine), the generator 14, and at least one traction battery 18. In this example, the second drive system is considered an electric drive system of the powertrain 10. The first and second drive systems generate torque to drive one or more sets of vehicle drive wheels 20 of the electrified vehicle.

The engine 12, which is an internal combustion engine in this example, and the generator 14 may be connected through a power transfer unit 22. In one non-limiting embodiment, the power transfer unit 22 is a planetary gear set that includes a ring gear 24, a sun gear 26, and a carrier assembly 28. Of course, other types of power transfer units, including other gear sets and transmissions, may be used to connect the engine 12 to the generator 14.

The generator 14 can be driven by engine 12 through the power transfer unit 22 to convert kinetic energy to electrical energy. The generator 14 can alternatively function as a motor to convert electrical energy into kinetic energy, thereby outputting torque to a shaft 30 connected to the power transfer unit 22. Because the generator 14 is operatively connected to the engine 12, the speed of the engine 12 can be controlled by the generator 14.

The ring gear 24 of the power transfer unit 22 may be connected to a shaft 32, which is connected to vehicle drive wheels 20 through a second power transfer unit 34. The second power transfer unit 34 may include a gear set having a plurality of gears 36. Other power transfer units may also be suitable. The gears 36 transfer torque from the engine 12 to a differential 38 to ultimately provide traction to the vehicle drive wheels 20. The differential 38 may include a plurality of gears that enable the transfer of torque to the vehicle drive wheels 20. In this example, the second power transfer unit 34 is mechanically coupled to an axle 40 through the differential 38 to distribute torque to the vehicle drive wheels 20.

The motor 16 (i.e., the second electric machine) can also be employed to drive the vehicle drive wheels 20 by outputting torque to a shaft 42 that is also connected to the second power transfer unit 34. In one embodiment, the motor 16 and the generator 14 cooperate as part of a regenerative braking system in which both the motor 16 and the generator 14 can be employed as motors to output torque. For example, the motor 16 and the generator 14 can each output electrical power to the traction battery 18.

The traction battery 18 has the form of a high-voltage battery that is capable of outputting electrical power to operate the motor 16 and the generator 14. The traction battery 18 is a traction battery as the traction battery 18 can provides power to drive the vehicle drive wheels 20. In the exemplary embodiment, the traction battery 18 includes a plurality of battery arrays 44 within a battery pack. Each of the battery arrays 44 includes a plurality of individual battery cells, say from eight to twelve cells.

Figure 2:
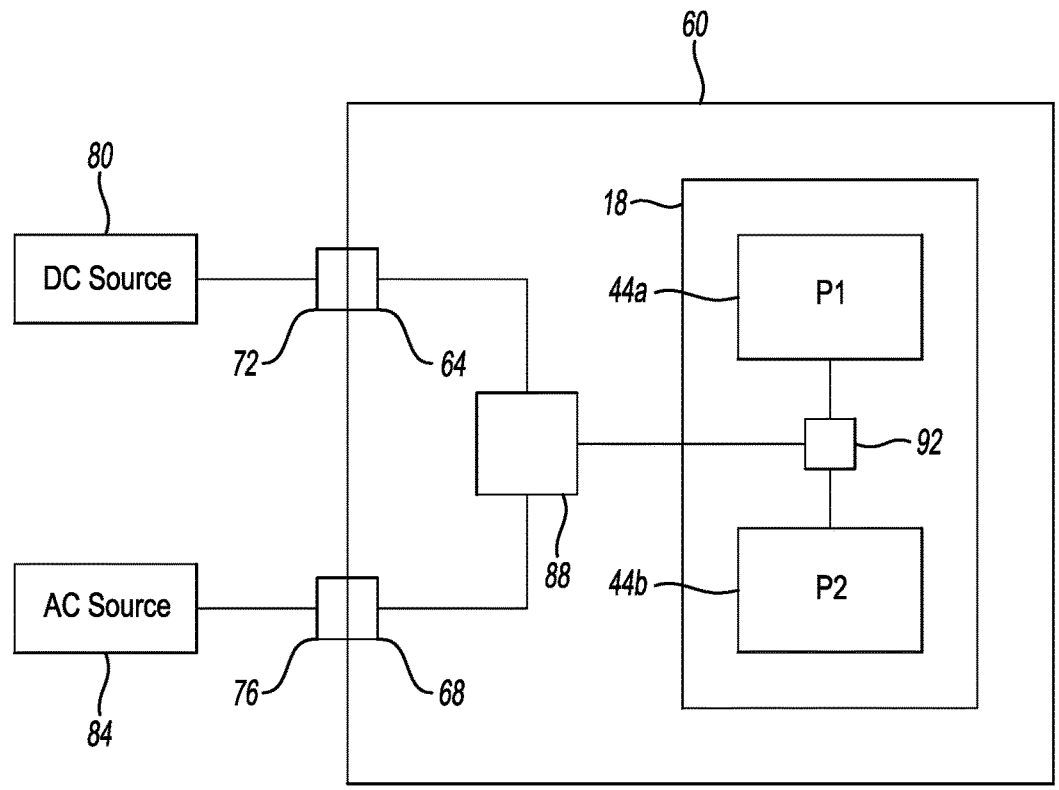
FIG. 2 schematically illustrates a system for charging a traction battery of the powertrain of FIG. 1 according to an exemplary embodiment of the present disclosure.

Referring now to FIG. 2, the traction battery 18 is disposed within an electrified vehicle 60, which is schematically represented. In the exemplary embodiment, the traction battery 18 includes a first battery array 44a and a second battery array 44b. The traction battery 18 can include other numbers of battery arrays in other examples.

The vehicle 60 includes a first charge port 64 and a second charge port 68. The first charge port 64 can be, for example, a DC charge port. The second charge port 68 can be, for example, an AC charge port. For drawing clarity, the first charge port 64 is shown as a separate port from the second charge port 68. This is not required, however. The first charge port 64 and the second charge port 68 could be different areas of the same charge port. Further, although shown an AC charge port and a DC charge port, that is not required. The ports 64 and 68 could be any combination of two or more charge inputs. For example, both could be Level 1 AC, one Level 1 AC and one Level 2 AC, both Level 2 AC, one level 1 AC and one CCS (DC fast charge).

When charging the traction battery 18 is desired, Electrified Vehicle Supply Equipment (EVSE), such as a charger 72, can be electrically connected to the first charge port 64 to electrically couple a DC source 80 of power to the electrified vehicle 60. When charging the traction battery 18 is desired, a charger 76 can instead, or additionally, be electrically connected to the second charge port 68 to electrically couple an AC source 84 of power to the electrified vehicle 60. The DC source 80 can be a 240 Volt, Level 2 charging station. The AC source 84 can be a 120 Volt, Level 1 type charging station. Charging from the DC source 80, as known, occurs more quickly than charging from the AC source 84. The DC source 80 is considered a fast charge, in some examples.

The electrified vehicle 60 includes charging system having a charge control module 88 that can, as required, electrically decouple the first array 44a from the second array 44b. An electrical divider, such as one or more switches 92, can be transitioned by the charge control module 88 electrically decouple the first array 44a from the second array 44b. Electrical decoupling the first array 44a from the second array 44b partitions the traction battery 18 into a plurality of partitions P1 and P2. Because the partition P1, which is the first array 44a in this example, is electrically decoupled from the partition P2, which is the second array 44b, the partition P1 can be considered separately chargeable from the second partition P2. After charging the partitions P1 and P2, the switches 92 can be transitioned back to a state that electrically couples the partitions P1 and P2 together.

In other examples, the traction battery 18 could be partitioned into separately chargeable partitions in other ways. Also, the traction battery 18 could be partitioned into more than two partitions.

In the exemplary embodiment, the chargers 72 and 76 are electrically connected to the respective first charge port 64 and second charge port 68 to charge the traction battery 18. Further, the charge control module 88 transitions the switches 92 to a state that partitions the traction battery 18 into the partitions P1 and P2.

The charge control module 88 can direct charge from the DC source 80 or the AC source 84 to the partition P1. Further, the charge control module 88 can direct charge from the DC source 80 or the AC source 84 to the partition P2. The charge control module 88 can include contactors and isolators utilized to redirect the charge from the DC source 80 and the AC source 84 to the partition P1 or the partition P2. A person having skill in this art and the benefit of this disclosure could understand how to redirect charge from a power source to a desired location using, for example, contactors and isolators.

After the partitioning, the charge control module 88 evaluates characteristics of the partitions P1 and P2. Characteristics can include, for example, voltage imbalance, SOC, temperature, and time in service.

In the exemplary embodiment, the evaluation includes comparing a voltage imbalance of the partition P1 to a voltage imbalance of the partition P2. Voltage imbalance generally refers to the variation in the voltages of the individual cells within the partitions P1 and P2. In this example, the partition P1 has a first voltage imbalance and the partition P2 has a second voltage imbalance that is greater than the first voltage imbalance. In other words, the partition P2 has more variation in the voltages between its individual cells than the partition P1.

As is known, a voltage imbalance can stabilize (i.e., reduce) over time. Further, a voltage imbalance can cause a SOC reading to vary. For example, a battery array with a high voltage imbalance may reflect a 100% SOC. However, after some time has passed and the voltage imbalances have stabilized, the SOC may have changed to 95%. Lower voltage imbalances can result in more accurate SOC readings, as known.

In the exemplary embodiment, the charge control module 88, in response to the evaluation, directs the power from the DC source 80 to the partition P2 and charges the partition P1 utilizing power from the AC source 84. Directing charge from the DC source 80 to the partition P2 having the lower voltage imbalance charges the partition P2 more quickly than the partition P1. This gives the voltage imbalance within the partition P1 additional time to stabilize.

The charge control module 88 can include a microcontroller unit (MCU). The charge control module 88 could include a single controller module, or selected portions of a plurality of different controller modules. The charge control module 88 used in connection with the above embodiments can be, for example, a Battery Charge Control Module (BCCM), a Battery Energy Control Module (BECM), or both.

The charge control module 88 can include, among other things, a processor and a memory portion. The processor can be programmed to execute a program stored in the memory portion. The processor can be a custom made or commercially available processor, a central processing unit (CPU), an auxiliary processor among several processors associated with the charge control module 88, a semiconductor based microprocessor (in the form of a microchip or chipset) or generally any device for executing software instructions.

The memory portion can include any one or combination of volatile memory elements. Programs can be stored in the memory portion as software code and used to initiate, for example, a transitioning of the switch 92 to electrically couple and electrically decouple the partitions P1 and P2. The programs can include one or more additional or separate programs, each of which includes an ordered list of executable instructions for implementing logical functions associated with charging and monitoring of the partitions P1 and P2. The programs can receive data about the partitions P1 and P2 from sensors or other measurement devices. The data can be analyzed using programs executed on the charge control module 88 to assess voltage imbalance, temperature, SOC, time in service, and other characteristics of the partitions P1 and P2.

Figure 3:
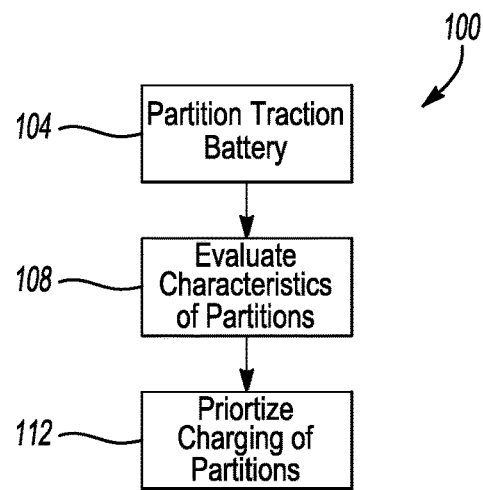
FIG. 3 illustrates a flow of a method used by the system of FIG. 2 for charging the traction battery.

Referring to FIG. 3, an exemplary method 100 utilized by the charging system in connection with the FIG. 2 embodiment begin at a step 104 where the traction battery 18 is partitioned to provide a plurality of partitions P1 and P2 that are each separately chargeable. Next, at a step 108, the method 100 evaluates at least one characteristic of the partitions P1 and P2. The method 100 then, at a step 112 prioritizes a charging of the partitions P1 and P2.

In the exemplary embodiment, the charging of the partitions P1 and P2 is prioritized based on the voltage imbalances of the partitions P1 and P2. The partition P1 or P2 with the greater voltage imbalance is charged using a power source that is slower here the AC source 84.

Other exemplary characteristics that could be utilized by the charge control module when assessing how to prioritize the charging of the partitions P1 and P2 could include the SOC for each of the partitions P1 and P2. In such an example, the partition P1 or P2 having the lower SOC could be charged utilizing the DC source 80, which charges faster than the AC source 84. The other partition could be charged utilizing the slower AC source 84. Assessing the SOC for each of the partitions P1 and P2 can include an open circuit voltage test for the respective partition P1 or P2.

Yet another characteristic that could be utilized by the charge control module 88 during the evaluating could include a temperature of the partitions P1 and P2. Charging can increase a temperature of the partitions P1 and P2. The charge from the DC source 80 can increase a temperature of the partitions P1 and P2 more quickly than a charge from the AC source 84. Based on the evaluating, the prioritizing could cause the partition P1 or P2 having the higher temperature to be charged utilizing the AC source 84. This can help to avoid stopping the charging because a temperature of one of the partitions P1 or P2 has exceeded a threshold temperature level.

In the example of FIGS. 2 and 3, two power sources 80 and 84 can be utilized to simultaneously charge the traction battery 18. In the exemplary embodiment of FIG. 4, a single power source 96 is utilized to charge the traction battery 18. The charge control module 88 prioritizes a charging of the first partition P1 and the second partition P2 from the power source 96 based on the characteristics of the partitions P1 and P2.

Figure 4:
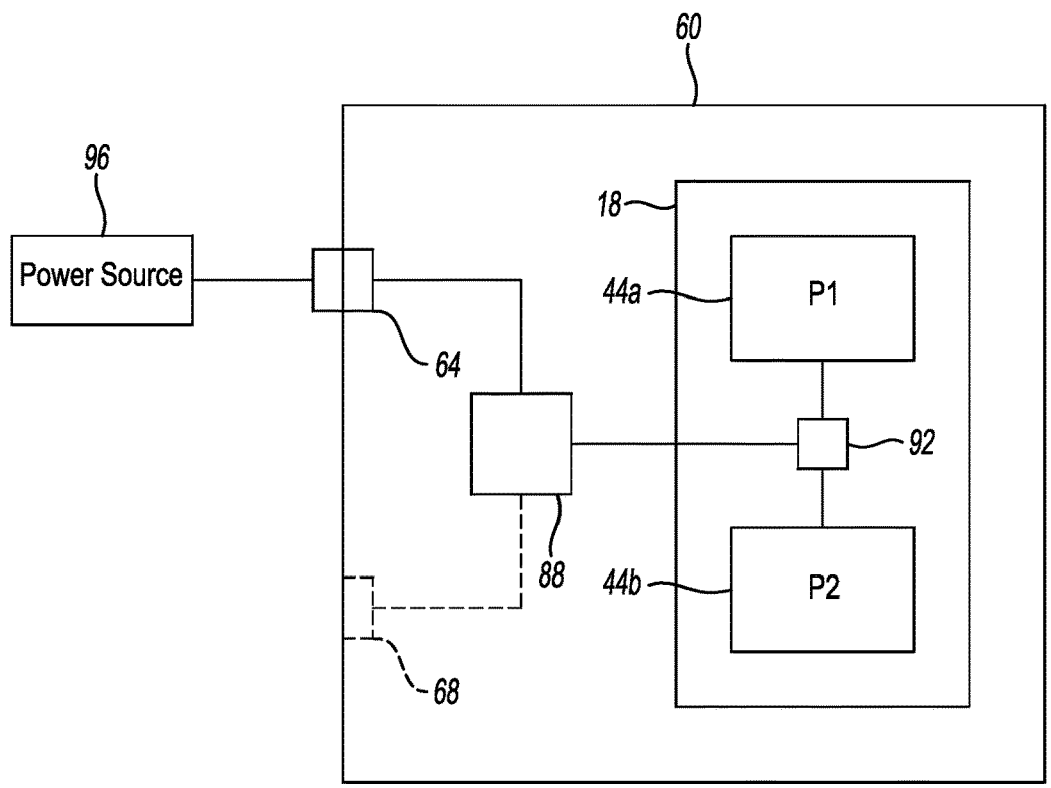
FIG. 4 schematically illustrates a system for charging a traction battery of the powertrain of FIG. 1 according to another exemplary embodiment of the present disclosure.
Figure 5:
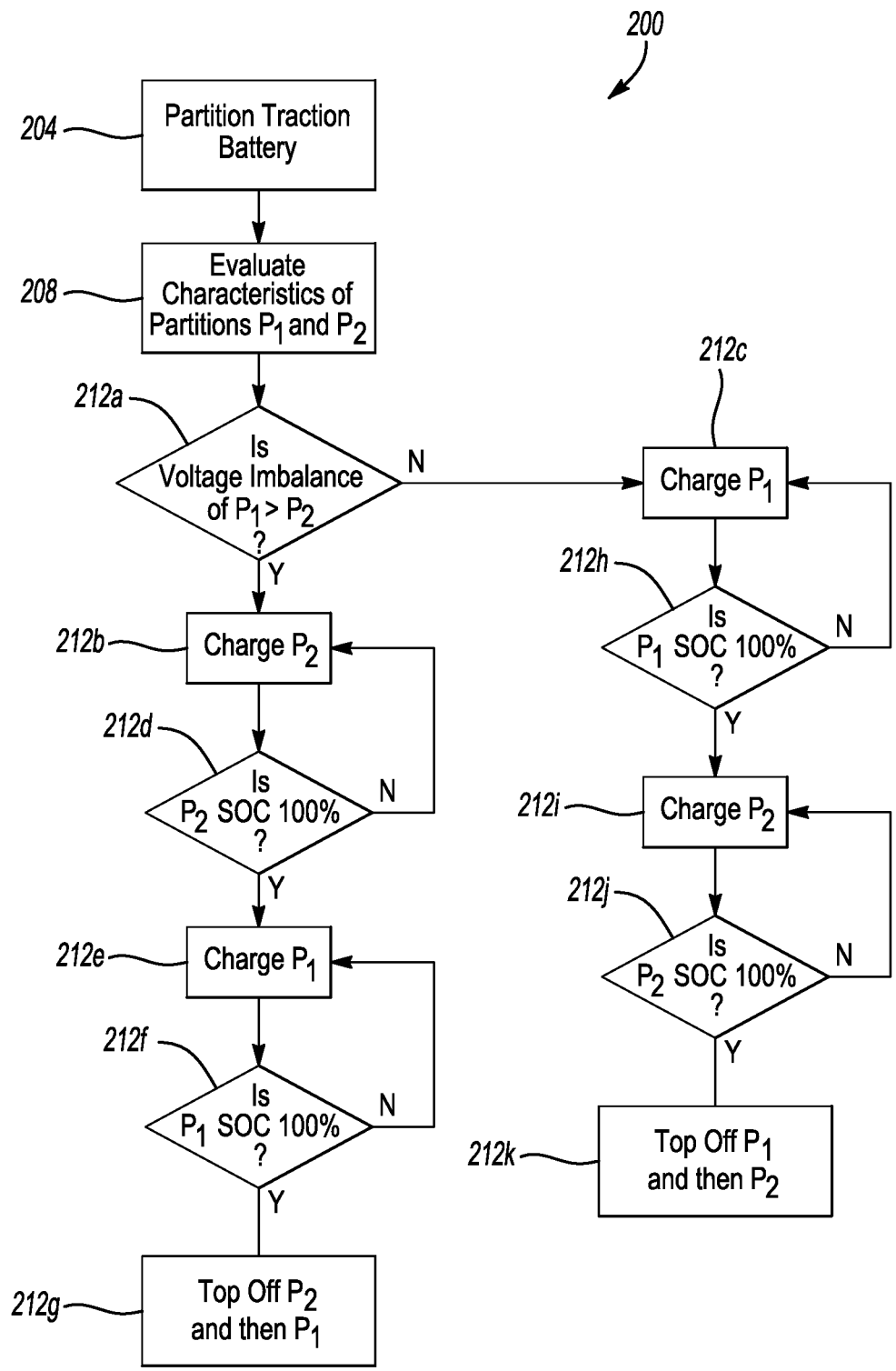
FIG. 5 illustrates a flow of a method used by the system of FIG. 5 for charging the traction battery.

Referring to FIG. 5, an exemplary method 200 utilized by the charging system in connection with the FIG. 4 embodiment begins at a step 204 where the traction battery 18 is partitioned to provide a plurality of partitions P1 and P2 that are each separately chargeable. Next, at a step 208, the method 200 evaluates at least one characteristic of the partitions P1 and P2. The method 200 then, at steps 212a-212k prioritizes a charging of the partitions P1 and P2.

In the exemplary embodiment, the charging of the partitions P1 and P2 is prioritized based on the voltage imbalances of the partitions P1 and P2. At the step 221a, the method 200 assess whether a voltage imbalance of the partition P1 is greater than a voltage imbalance of the partition P2. If yes, the method 200 moves to the step 212b. If no, the method moves to the step 212c.

At the step 212b, the method 200 charges the partition P2. The method 200 then moves to the step 212d where the charge is continued until the SOC for the partition P2 is assessed as 100% SOC.

If the SOC is assessed as 100% in the step 212d, the method 200 moves to the step 212e. If not, the charging of the partition P2 continues. As the partition P2 is charging, voltage imbalances in the partition P1 are stabilizing.

At the step 212e, the method 200 switches over to charge the partition P1. As the partition P1 is charging, the method 200 may perform an open circuit voltage evaluation of the partition P2 to monitor the SOC of the partition P2. This effectively resets the SOC assessment of the partition P2. Over time, the SOC of the partition P2 may change due to voltage imbalances stabilizing. In some examples, the SOC may decrease from a reading of 100% SOC to 95% due to voltage imbalances stabilizing as the partition P1 is charging.

The method 200 moves from the step 212e to the step 212f where the charge of the partition P1 is continued until the SOC for the partition P1 is 100%. If the SOC is assessed as 100% at the step 212f, the method 200 moves to the step 212g. If not, the charging of the partition P1 continues.

At the step 212g, the method 200 transitions back to charging the partition P2, if required. Here the method 200, if required, tops off the partition P2 until the SOC is 100%. Charging the partition P2 again to "top off" the partition P2 may be required if voltage imbalances in the partition P2 have stabilized while the partition P1 was being charged and caused the SOC of the partition P2 to drop.

As the method 200 is topping off the charge in the partition P2, the method 200 may perform an open circuit voltage evaluation of the partition P1 to monitor the SOC of the partition P1. While the partition P2 is being topped off, the SOC of the partition P1 may change due to voltage imbalances stabilizing.

After topping off the charging of the partition P2, the method 200 tops off the charge in the partition P1, if required.

At the step 212c, the method 200 charges the partition P1. The method 200 then moves to the step 212h where the charging continues until the SOC for the partition P1 is 100%. As the partition P1 is charging, voltage imbalances in the partition P2 are stabilizing. If the SOC is 100% at the step 212h, the method 200 moves to the step 212i. If not, the charging of the partition P2 continues.

At the step 212i, the method 200 charges the partition P2. The method 200 then moves to the step 212j where the charging continues until the SOC for the partition P2 is 100%. If the SOC is 100% at the step 212j, the method 200 moves to the step 212k. If not, the charging of the partition P1 continues.

At the step 212k, the method 200 reassesses the SOC for the partition P1 and, if required, tops off the partition P1 so that the reassessed SOC is 100%. Charging the partition P1 again to "top off" the partition P1 may be required if voltage imbalances in the partition P1 have stabilized and reduced the SOC of the partition P1 while the partition P2 was being charged. After topping off the charging of the partition P1, the method 200 similarly tops off the charge in the partition P2, if required.

The method 200 is described in connection with voltage imbalances. The method 200 could prioritize based instead, or additionally, on other characteristics. For example, the partition P1 or P2 with a lower temperature could be charged from the power source first giving the partition P1 or P2 with the higher temperature some time to cool. The SOC for the partitions P1 and P2 could then be topped off as required.

In the exemplary method 200, the power source 96 is the only power source used to charge the partitions P1 and P2. The method 200 could be modified if another power source is available, such as a power source that can charge the partitions P1 or P2 through the charge port 68. In such an example, the charging controller 88 can alternate between the power sources such that the slower power source is charging the partition P1 or P2 having the greater voltage imbalance, higher temperature, etc.

Features of the disclosed embodiments include a method and system of charging a traction battery of an electrified vehicle that can reduce charge time and facilitate a more complete charge of the traction battery. This can, in some examples, increase a range of the electrified vehicle and enhance user satisfaction.

Although a specific component relationship is illustrated in the figures of this disclosure, the illustrations are not intended to limit this disclosure. In other words, the placement and orientation of the various components shown could vary within the scope of this disclosure. In addition, the various figures accompanying this disclosure are not necessarily to scale, and some features may be exaggerated or minimized to show certain details of a particular component.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A method of charging a traction battery of a vehicle, comprising:
   partitioning a traction battery of an electrified vehicle into a plurality of partitions, each of the partitions separately chargeable;
   evaluating at least one characteristic of the plurality of partitions, the at least one characteristic including a voltage imbalance for each of the partitions within the plurality of partitions;
   prioritizing a charging of the plurality of partitions from at least one external power source based at least in part on the evaluating of the voltage imbalance for each of the partitions within the plurality of partitions; and
   wherein, during the evaluating, a first one of the plurality of partitions has a first voltage imbalance and a second one of the plurality of partitions has a second voltage imbalance that is greater than the first voltage imbalance, and further comprising prioritizing by charging the first one of the plurality of partitions prior to the second one of the plurality of partitions due to the second voltage imbalance being greater than the first voltage imbalance.

2. The method of claim 1, wherein, during the evaluating, a first one of the plurality of partitions has a first voltage imbalance and a second one of the plurality of partitions has a second voltage imbalance that is greater than the first voltage imbalance, and further comprising prioritizing by fast charging the first one of the partitions due to the second voltage imbalance being greater than the first voltage imbalance.

3. The method of claim 1, wherein the at least one characteristic further includes a state of charge for each of the partitions within the plurality of partitions,
wherein during the evaluating, a first one of the plurality of partitions has a first state of charge and a second one of the plurality of partitions has a second state of charge that is greater than the first state of charge, and further comprising prioritizing by charging the first one of the plurality of partitions prior to the second one of the plurality of partitions due to the second state of charge being greater than the first state of charge.

4. The method of claim 1,
wherein the at least one characteristic further includes a temperature for each of the partitions within the plurality of partitions,
wherein during the evaluating, a first one of the plurality of partitions has a first temperature and a second one of the plurality of partitions has a second temperature that is greater than the first temperature, and further comprising prioritizing by charging the first one of the plurality of partitions prior to the second one of the plurality of partitions due to the second temperature being greater than the first temperature.

5. The method of claim 1, wherein each of the partitions within the plurality of partitions is a separate array of a battery pack.

6. The method of claim 1, wherein each of the partitions within the plurality of partitions is electrically isolated from the other partitions within the plurality of partitions.

7. A method of charging a traction battery of a vehicle, comprising:
partitioning a traction battery of an electrified vehicle into a plurality of partitions, each of the partitions separately chargeable;
evaluating at least one characteristic of the plurality of partitions; and
prioritizing a charging of the plurality of partitions from at least one external power source based on the evaluating,
wherein the prioritizing includes using a first external power source to charge the first partition and a second external power source to charge the second partition.

8. The method of claim 7, wherein the first external power source is a DC power source and the second external source is an AC power source.

9. The method of claim 7, further comprising charging the first partition from the first external power source through a first charge port of the electrified vehicle, and, at the same time, charging the second partition from the second external power source through a second charge port of the electrified vehicle.

10. An electrified vehicle charging system, comprising:
a traction battery;
an electrical divider that can divide the traction battery into a plurality of partitions that are separately chargeable and electrically isolated from one another; and
a charge control module that evaluates at least one characteristic of the plurality of partitions and, in response, prioritizes a charging of the plurality of partitions from at least one external power source,
wherein the charge control module prioritizes by using a first external power source to charge the first partition while using a second external power source to charge the second partition.

11. The electrified vehicle charging system of claim 10, wherein the at least one characteristic is a voltage imbalance for each of the partitions within the plurality of partitions.

12. The electrified vehicle charging system of claim 10, wherein the first external power source is a DC power source and the second external source is an AC power source.

13. The electrified vehicle charging system of claim 10, further comprising a first charge port of the electrified vehicle and a second charge port of the electrified vehicle, the first charge port configured to communicate power from the DC power source to the electrified vehicle, the second charge port configured to communicate power from the AC power source to the electrified vehicle.

14. The electrified vehicle charging system of claim 10, wherein each of the partitions within the plurality of partitions is a separate array of a battery pack.

15. The electrified vehicle charging system of claim 10, wherein each of the partitions within the plurality of partitions is electrically isolated from the other partitions within the plurality of partitions.

\* \* \* \* \*